(12) United States Patent
Spengler et al.

(10) Patent No.: US 10,964,519 B2
(45) Date of Patent: Mar. 30, 2021

(54) APPARATUS FOR MASS-SPECTROMETRIC ANALYSIS AND THREE-DIMENSIONAL IMAGING OF THE SURFACE OF SPECIMENS

(71) Applicant: JUSTUS-LIEBIG-UNIVERSITAET GIESSEN, Giessen (DE)

(72) Inventors: Bernhard Spengler, Linden (DE); Mario Kompauer, Giessen (DE)

(73) Assignee: JUSTUS-LIEBIG-UNIVERSITAET GIESSEN, Giessen (DE)

( * ) Notice: Subject to any disclaimer, the term of this patent is extended or adjusted under 35 U.S.C. 154(b) by 0 days.

(21) Appl. No.: 16/339,993

(22) PCT Filed: Oct. 6, 2017

(86) PCT No.: PCT/EP2017/075434
§ 371 (c)(1),
(2) Date: Apr. 5, 2019

(87) PCT Pub. No.: WO2018/065559
PCT Pub. Date: Apr. 12, 2018

(65) Prior Publication Data
US 2020/0043714 A1    Feb. 6, 2020

(30) Foreign Application Priority Data
Oct. 7, 2016 (EP) ...................... 16192722

(51) Int. Cl.
*H01J 49/16* (2006.01)
*H01J 49/00* (2006.01)
*H01J 49/40* (2006.01)

(52) U.S. Cl.
CPC ........ *H01J 49/164* (2013.01); *H01J 49/0004* (2013.01); *H01J 49/40* (2013.01)

(58) Field of Classification Search
CPC ....... H01J 49/164; H01J 49/0004; H01J 49/40
(Continued)

(56) References Cited

U.S. PATENT DOCUMENTS

| 7,180,058 B1 | 2/2007 | Izgarian |
| 2005/0176011 A1* | 8/2005 | Chan ................ G01N 33/57438 435/6.14 |

(Continued)

FOREIGN PATENT DOCUMENTS

| EP | 1739719 A2 | 1/2007 |
| JP | H04126347 A | 4/1992 |
| WO | WO-2016090356 A1 | 6/2016 |

OTHER PUBLICATIONS

European Search Report for Application No. EP 16192722.3, dated Mar. 14, 2017.
(Continued)

*Primary Examiner* — Nicole M Ippolito
(74) *Attorney, Agent, or Firm* — Marshall, Gerstein & Borun LLP (57) ABSTRACT

The invention relates to an apparatus for mass-spectrometric analysis and three-dimensional imaging of the surface of a sample, comprising at least one energy source for desorbing and/or ionizing atoms from the surface of a sample, a displacement stage, and a light source. Further, it comprises an interface in order to be able to interchange data with a mass spectrometer such that measurement data can be transmitted from a mass spectrometer to the evaluation unit via the interface such that the chemical composition of the measurement point can be determined by the evaluation unit. The surface of a sample can be captured in three dimensions and the topography of this surface can be determined by the evaluation unit.

15 Claims, 5 Drawing Sheets

(58) Field of Classification Search
USPC .................................. 250/281, 282, 283, 288
See application file for complete search history.

(56) References Cited

U.S. PATENT DOCUMENTS

| | | | |
|---|---|---|---|
| 2008/0149822 A1 | 6/2008 | Vertes et al. | |
| 2014/0323330 A1* | 10/2014 | Bergo | G01N 33/54373 506/9 |
| 2019/0212230 A1* | 7/2019 | Novosselov | H01J 49/167 |
| 2020/0025677 A1* | 1/2020 | Prater | G01N 21/6458 |

OTHER PUBLICATIONS

International Search Report for PCT Application No. PCT/EP2017/075434, dated Dec. 19, 2017. (English Translation).

Spengler et al., "Scanning Microprobe Matrix-Assisted Laser Desorption Ionization (SMALDI) Mass Spectrometry: Instrumentation for Sub-Micrometer Resolved LDI and MALDI Surface Analysis", J Am Soc Mass Spectrom, 13:735-748 (2002).

Office Action in corresponding Japanese patent application No. 2019-516524, dated Mar. 19, 2020.

Office Action in corresponding European Patent Application No. 16 192 722.3, dated Nov. 6, 2020.

* cited by examiner

APPARATUS FOR MASS-SPECTROMETRIC ANALYSIS AND THREE-DIMENSIONAL IMAGING OF THE SURFACE OF SPECIMENS

The invention describes an apparatus and a method for measuring and analyzing the chemical composition and the three-dimensional structure of surfaces of samples.

DESCRIPTION AND INTRODUCTION TO THE GENERAL FIELD OF THE INVENTION

The object of spatially resolved (imaging) microscale surface analysis is to qualitatively and/or quantitatively image the chemical composition of a sample (e.g., a biological tissue or object) with a high lateral resolution. In this context, microscale means that the size of a measurement point is between 0.5 µm and 10 µm.

Here, sample denotes the totality of material to be examined. As a chemical substance or substance mixture, this material can be liquid (such as freshwater samples, urine samples) or solid (such as a rock sample) or a mixture of different phases (e.g., a moist soil sample). In the case of spatially resolved (imaging) microscale surface analysis, samples are examined in the solid phase.

Unlike an optical microscope image, such an analytical image shows the distribution of quantities of a certain substance within the sample. Here, methods that facilitate the determination of the chemical composition on plane samples and the pictorial representation of said chemical composition in two-dimensional representations of the chemical composition, and also that produce three-dimensional chemical distribution images from a plurality of two-dimensional images (measurements), are known. These methods include laser-assisted mass-spectrometric methods, such as laser desorption/ionization mass spectrometry (LDI-MS), matrix-assisted laser desorption/ionization mass spectrometry (MALDI-MS) and secondary ion mass spectrometry (SIMS), but also laser ablation reionization mass spectrometry.

Here, desorption denotes the process by which (predominantly) uncharged atoms or molecules leave the surface of a solid.

Ionization refers to any process in which one or more charge carriers are removed from, or added to, an atom or molecule such that the atom or molecule remains as a positively or negatively charged ion.

PRIOR ART

A conventional MALDI-MS method for two-dimensional mapping of concentrations of specific molecules is described in the document U.S. Pat. No. 5,808,300, for example. Here, the sample surface is subdivided into individual measurement points and one defined point of the sample surface is bombarded in each case by a focused laser beam and the released ions are detected. Then, this is repeated for every other point on the sample surface. It is not possible here to obtain simultaneous information about the topography of the sample and the surface composition thereof. There is no link between the two-dimensional, spatial distribution of a substance and the topography of a sample. Here, topography refers to the height or thickness of a sample at a specific location.

In contrast thereto, although confocal laser-scanning microscopy supplies a three-dimensional image, it supplies no direct information about the chemical composition of the sample.

OBJECT

It is an object of the invention to provide an apparatus for facilitating a simultaneous analysis of the two-dimensional, spatial chemical composition and the topography of a sample.

ACHIEVING THE OBJECT

According to the invention, this object is achieved by an apparatus and a method having the features of claim 1. Advantageous embodiments and developments of the present invention arise from the dependent claims.

Here, the apparatus 100, 200 according to the invention is provided for use with various mass spectrometers. It can be used with all mass spectrometers known to a person skilled in the art which comprise an atmospheric pressure inlet system or which operate at a reduced or elevated pressure in the sample chamber. These include inter alia: quadrupole, ion trap, ion cyclotron and orbital trap mass spectrometers and time-of-flight (TOF) mass spectrometers. Here, the apparatus according to the invention is suitable for all methods of desorption and/or ionization of surfaces (desorption methods), for example for LDI (laser desorption ionization), MALDI (matrix-assisted laser desorption ionization) and laser ablation with reionization.

The apparatus 100, 200 according to the invention for mass-spectrometric analysis and three-dimensional imaging of the surface of objects in this case comprises at least one energy source 20, 10 for desorbing or desorbing and ionizing of atoms from the surface of a sample by means of a desorption/ionization beam 2 and the transmission of said atoms into a mass spectrometer 7.

Furthermore, the apparatus 100, 200 comprises a displacement stage 1 that is embodied such that a sample to be examined can be applied thereto, the beam path of the energy source 20, 10 and the displacement stage 1 being embodied to be movable in relation to one another.

Furthermore, the apparatus 100, 200 comprises an interface 50 for being able to interchange data with a mass spectrometer 7. Here, the interface 50 is embodied in such a way that measurement data about the chemical composition of the surface of the sample at a measurement point 60 can be transmitted from a mass spectrometer to the evaluation unit 40 via the interface 50 such that the chemical composition of the measurement point 60 can be determined by the evaluation unit 40. By way of example, the interface 50 can be an ISA, PCI, USB or EIA-232 interface. An interface for wireless data transmission, such as WLAN, Wi-Fi, IEEE 802.11 or Bluetooth is likewise possible.

Furthermore, the apparatus 100, 200 comprises a light source 8, 10, at least one optical system 3 and at least one light detector 4 and an evaluation unit 40. These are embodied in such a way that a measurement point 60 on the sample is illuminated by the light source 8, 10 and light reflected or scattered by the measurement point 60 is captured by the light detector 4 such that the surface of a sample can be captured in three dimensions and the topography of this surface can be determined by the evaluation unit 40.

Here, the light detector 4 preferably consists of a component by means of which radiation can be perceived in position-sensitive fashion (e.g., a quadrant detector, a position-sensitive detector, a CCD sensor or video camera chip).

The optical system 3 preferably comprises one or more of the following components: lens elements, stops, mirrors, filters, telecentric objective lenses, light guides. Here, this component or these components is/are arranged in such a way that the light from the light source 8, 10 can be formed or guided in such a way on the path from the sample surface to the light detector 4 that the latter can process the reflected and/or scattered light in optimal fashion.

Furthermore, the apparatus 100, 200 comprises a control unit 30 for controlling the displacement stage 1, the energy source 20, 10 and the light source 8, 10, the latter being embodied such that the surface of a sample can be irradiated in punctiform fashion by the energy source 20 and the light source 8, 10.

In a second embodiment of the apparatus 100, 200 according to the invention, the energy source 10, 20 is embodied as a desorption or an ionization laser. Here, the preferred wavelength lies in the ultraviolet, visible or infrared range. Typically employed lasers are KrF excimer lasers ($\lambda=248$ nm) and frequency-quadrupled Nd:YAG lasers ($\lambda=266$ nm). In contrast to other ionization methods (e.g., electrospray ionization (ESI), atmospheric pressure chemical ionization (APCI)), lasers as an energy source 10, 20 allow the production of ions independently of electric fields as ions can only be formed in the laser. However, it is also possible to use a different energy source 20, for example an electrospray emitter or a primary ion or neutral particle source.

In a third embodiment of the apparatus 100, 200 according to the invention, the light source 8, 10 is embodied as a laser. Here, the preferred wavelength lies in the visible optical range with a wavelength of between 320 nm and 750 nm. This wavelength range represents a compromise between highest possible resolution and lowest possible influencing of the surface.

In a fourth embodiment of the apparatus 100, 200 according to the invention, the latter furthermore comprises an ion guidance channel 6 for guiding ions that were released from the surface of a sample by the energy source 20, 10. Said ion guidance channel is embodied in such a way that ions can be guided in targeted fashion to a connected mass spectrometer 7.

In a fifth embodiment of the apparatus 100, 200 according to the invention, the latter furthermore comprises a focusing system 11 for focusing the radiation from the energy source 20, 10 on the surface of a sample. Here, the focusing system 11 may comprise one or more of the following components: mirrors, lens elements, stops, filters, light guides, a lens element with a central bore 5, telecentric objective lenses.

In a sixth embodiment, the apparatus 100, 200 according to the invention furthermore comprises a focusing system 12 for focusing the radiation from the light source 8 on the surface of a sample. This facilitates illumination of the microscale measurement point 60 only and prevents scattering signals from adjacent regions. This is of particular importance if the light source comprises no internal optical unit. Here, the second focusing system may comprise one or more of the following components: mirrors, lens elements, stops, filters, light guides, lens elements with a central bore 5, telecentric objective lenses.

The focusing system 12 for the light source 8 and the focusing system 11 for the energy source 20 can be used individually and in combination. They are controlled by way of the control unit 30.

In a seventh embodiment of the apparatus 200 according to the invention, the energy source 10 for the desorption/ionization and the light source 10 are formed by the same laser. (FIG. 4) This facilitates a simpler and more cost-effective construction of the apparatus according to the invention. Here, a uniform focusing system is preferably used for this light source/energy source 10 in order to be able to precisely irradiate a measurement point 60. Here, the focusing system can be constructed from mirrors, lens elements, stops, filters, light guides, lens elements with a central bore 5, and telecentric objective lenses.

Preferably, the light detector 4 of the apparatus 100, 200 according to the invention is embodied in such a way that it is positioned at an angle $\alpha$ of more than 0° (preferably more than 45°) relative to the sample surface, with said light detector producing a measurement image of the sample surface and/or of the measurement point 60.

The various embodiments can also be combined with one another without any particular further inventive step being necessary. An adaptation to the exact field of use is conventional for persons skilled in the art in the field of mass-spectrometric examinations, in particular an adaptation to the type of samples or desired spatial resolution.

In a method for mass-spectrometric analysis and imaging of the surface of a sample using an apparatus 100, 200 according to the invention in accordance with one of the aforementioned embodiments, the sample to be examined is examined in punctiform fashion during scanning operation by moving the displacement stage or the energy source 20. Here, a scanning operation refers to the systematic, regular sampling or measuring of the surface, either in an incremental point-by-point process or in a temporally synchronized continuous progress of the movement of the displacement stage or the energy source, and the construction of a scanning image produced therefrom. The basic concept lies in obtaining an overall image of the surface using relatively restricted measurement instruments by way of a multiplicity of individual measurements. To this end, the x and y coordinates are always also determined for each measurement point. The x and the y coordinate describe the position of a point on a plane that lies parallel to the surface of the sample.

In a second embodiment of the method, the z-coordinate or the z-position of individual points of the sample surface is additionally determined. Here, the spatial direction perpendicular to the surface of the sample is assumed to be the z-coordinate.

In a third embodiment of the method, the output signals of the light detector of the apparatus according to the invention serve to control the scanning operation, with scanning (moving in the xy-plane) and a determination of the topography by way of evaluating the z-coordinate being undertaken.

In a fourth embodiment of the method, the position of the displacement stage 1 is modified in targeted fashion by the control unit 30 for the purposes of realizing the scanning operation.

In a fifth embodiment of the method, the position of the imaging system for focusing the energy source 20, 10 is modified in targeted fashion by the control unit 30 for the purposes of realizing the scanning operation.

In a sixth embodiment of the method, mass-spectrometric raw data are obtained from the sample to be examined. Here, the mass-spectrometric raw data relating to a measurement point 60 should be understood to mean the ratios of mass to charge number, the ion signal intensities and the coordinates (x, y, z).

In a seventh embodiment of the method, a multi-dimensional data matrix is produced by virtue of the calculated mass-to-charge number centroids, intensities and Cartesian coordinates being assigned to each detected mass-spectrometric signal.

In an eighth embodiment of the method, height and distribution information is converted into grayscale or color coding and pictorial representations are produced.

Evaluation Method:

For the purposes of carrying out the evaluation method, a sample to be examined is initially attached to a displacement stage 1. In the process, it is preferably situated on a sample holder on the displacement stage 1. The drawings of FIGS. 1, 2, 3 and 4 show how a microscale measurement point 60 is produced by a light source 8, 10 and imaged on the sample by an optical system 3. The reflected/scattered measurement beam of the light source 8, 10 is imaged on the light detector 4 by an optical system 3. The position of the image of the measurement point on the light detector 4 is evaluated by the evaluation unit 40. The relative change in position of the measurement point is calculated and the deviation of the z-position from the working plane of the object, defined previously for the microscale scanning examination, is calculated from this information. The current z-position of the object in the measurement point is moved into the predetermined working plane with the aid of this value. The displacement value is stored as height information for the measurement point. The chemical information (chemical composition) of the measurement point on the surface of the object is recorded with the aid of a suitable detection method, such as, for example, laser desorption/ionization mass spectrometry (LDI-MS) or matrix-assisted laser desorption/ionization mass spectrometry (MALDI-MS), secondary ion mass spectrometry (SIMS) or desorption electrospray ionization mass spectrometry (DESI-MS). Laser-based spatially resolved methods have a high numerical aperture and hence a small depth of field (depth of focus) in the case of a high spatial resolution (i.e., in the case of small measurement points). Therefore, the working plane for the respective measurement point must be driven to with great accuracy for a mass-spectrometric examination of the measurement point. Other desorption/ionization methods have, in part, other geometric boundary conditions for a successful analysis of the measurement point, said geometric boundary conditions likewise requiring driving to the working plane. By way of example, for DESI-MS, the angles and distances between DESI beam, sample measurement point and inlet opening of the mass spectrometer must be observed.

In the drawings of FIGS. 1, 2, 3, 4, the sample holder can also be at an angle that deviates from the shown angles.

Image Analysis Method

Figure 1:
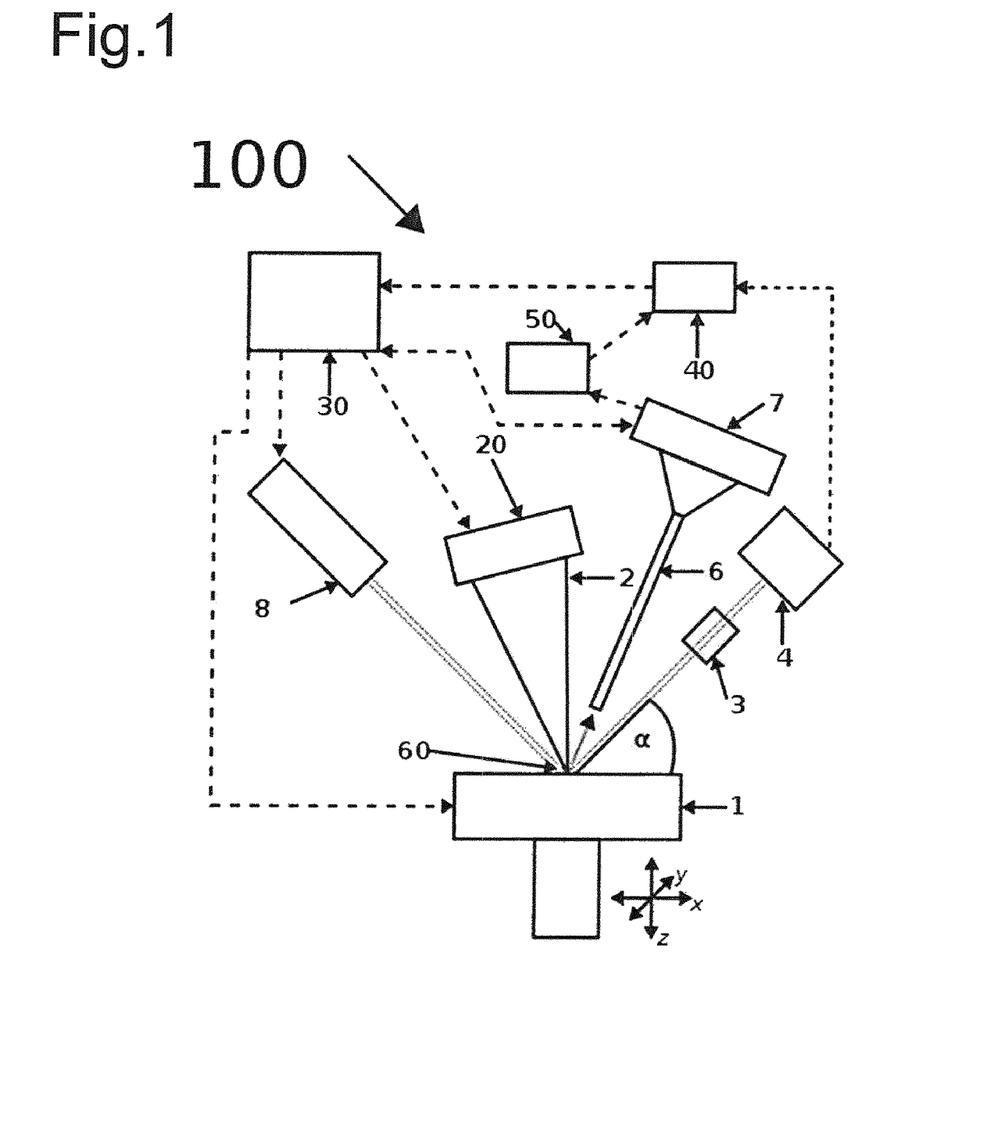
FIG. 1 shows the apparatus 100 according to the invention.
Figure 2:
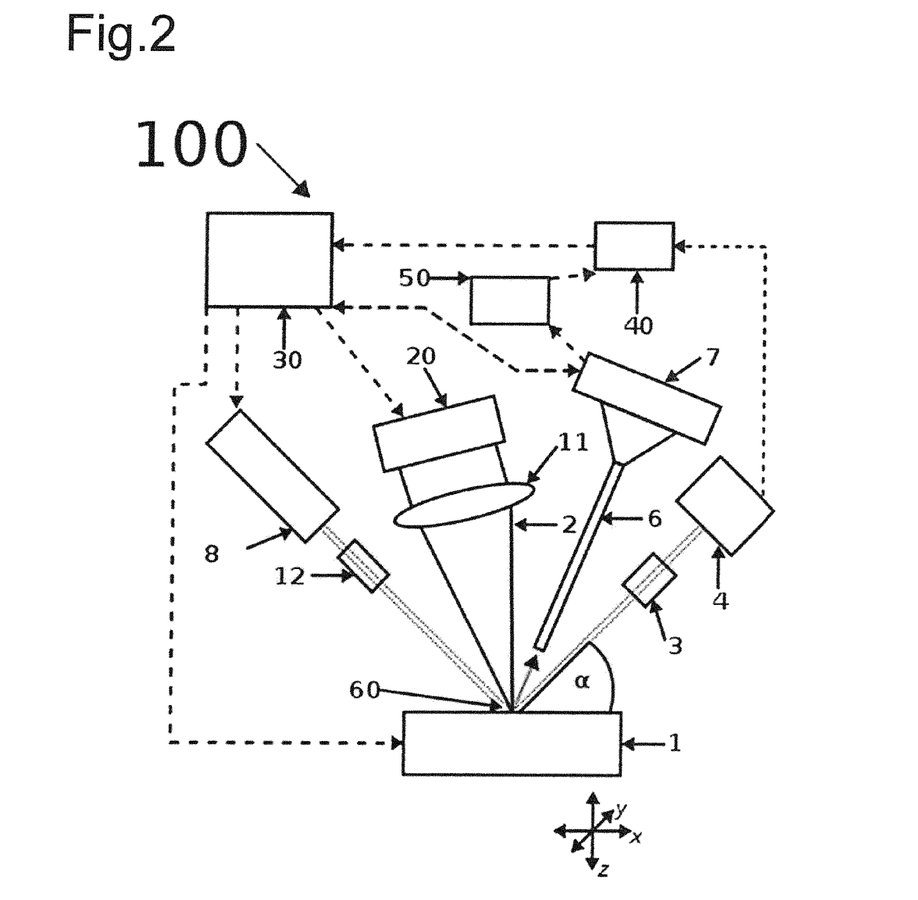
FIG. 2 shows the apparatus 100 according to the invention in a further embodiment, using a focusing system 12 for a light source 8 and a focusing system 11 for an energy source 20.
Figure 3:
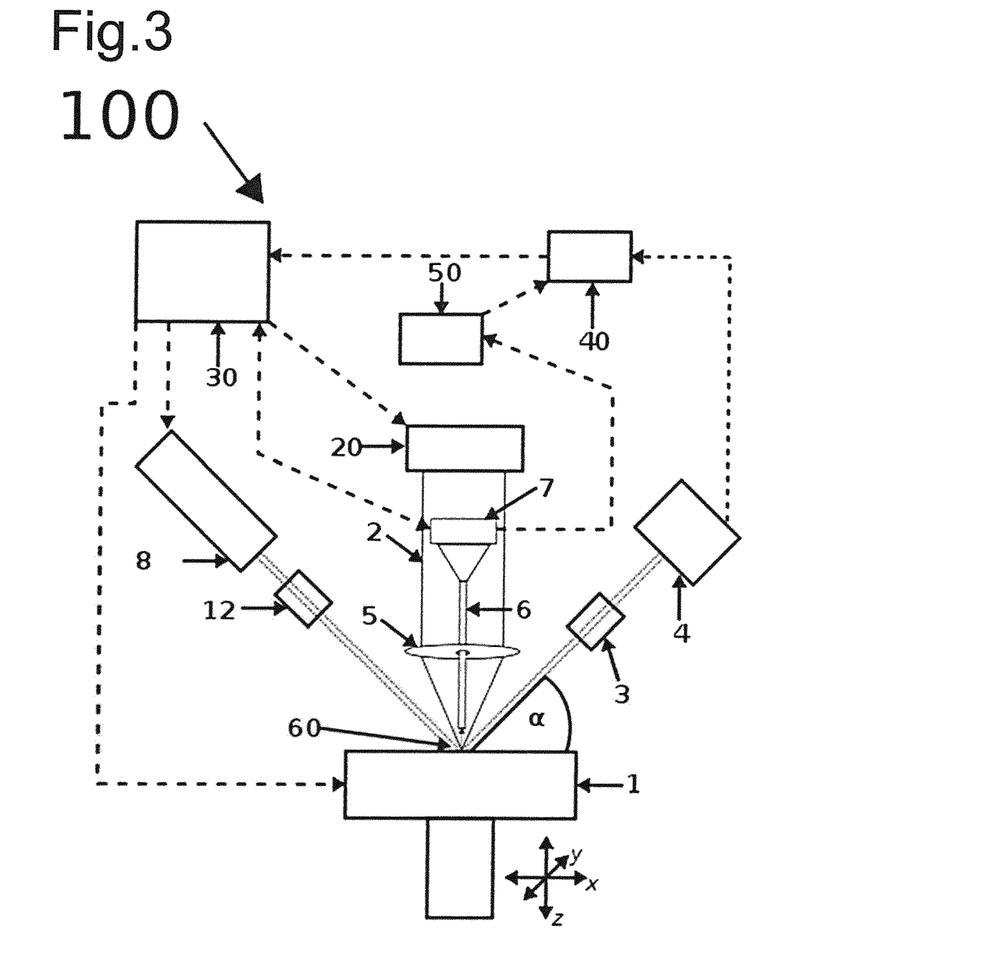
FIG. 3 shows the apparatus 100 according to the invention in the embodiment using a lens element 5 through which a bore has been drilled.
Figure 4:
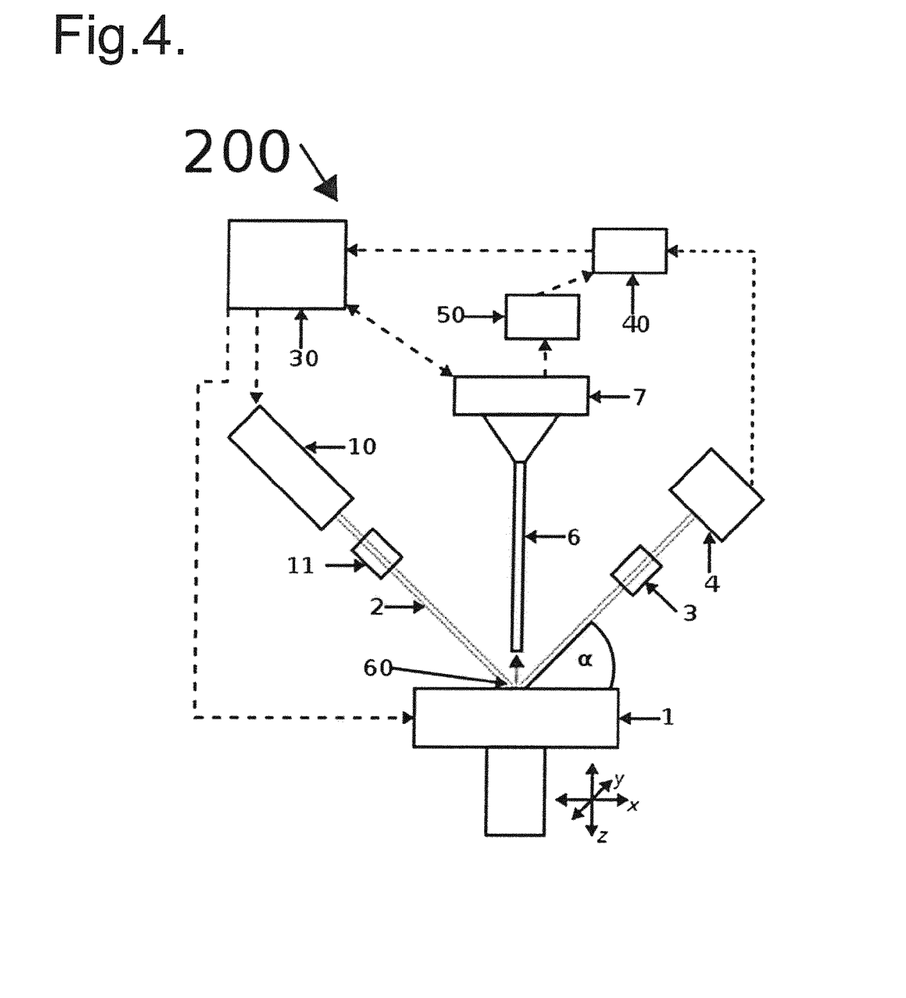
FIG. 4 shows the apparatus 200 according to the invention in the embodiment where the desorption/ionization laser is also used as a light source for determining the height.

In an alternative embodiment of the method according to the invention, a light detector 4 with an optical system 3 is positioned at an angle α of more than 0° relative to the sample surface. The sample surface is illuminated by the light source 8, 10. The optimal focal plane of the desorption/ionization beam 2 of the energy source 20 is determined by evaluating the information of the illuminated, imaged sample surface. In the case of a correct arrangement, the highest contrast value, for example, or the maximum standard deviation of an image region comprising 5×5 pixels corresponds to the focal plane of the desorption/ionization beam 2. The contrast value C is given by $C=(I_{MAX}-I_A)/I_A$, for example, where $I_{max}$ is the maximum intensity of the detected image of the sample and $I_A$ is the mean intensity of the detected image of the sample. Measuring the position of, e.g., the highest contrast value or the greatest standard deviation relative to the measurement point allows the z-position to be corrected in order to move the sample in the measurement point into the focal plane of the ionization laser. The height information is derived from the displacement travel of the displacement stage along the z-coordinate. Moreover, it is possible to determine the position of the highest contrast or the greatest standard deviation by way of a systematic iteration and focus variation. The z-position for the given measurement point can likewise be derived from this information. In the embodiment of the apparatus as shown in FIG. 4, the measurement point 60 on the sample produced by the desorption/ionization beam of the energy source 10 can moreover be used directly to determine the height information.

After the working plane for the measurement point is driven to by way of one of the above-described methods, the selected desorption beam is used to desorb analyte material from the microscale measurement point and ionize said analyte material or ionize said analyte material in a following step. The ions move to the ion guidance channel 6 of one of the described mass spectrometers 7. Information about the chemical composition of the microscale measurement point is obtained directly by the mass-spectrometric analysis.

Consequently, the z-position of the measurement point is initially moved into the working plane for each measurement point, and hence the sample height of the measurement point is determined. Subsequently, the mass-spectrometric analysis is carried out to determine the chemical composition before the next measurement point is driven to and the latter is examined in turn in relation to height information and chemical information. After scanning the sample surface by moving in the x and y direction and by regulating the z-coordinate for each measurement point, the topography of the sample surface is imaged by evaluating the z-coordinates. The mass-spectrometric analysis of the ions from each microscale measurement point supplies the chemical information about the composition.

Figure 5:
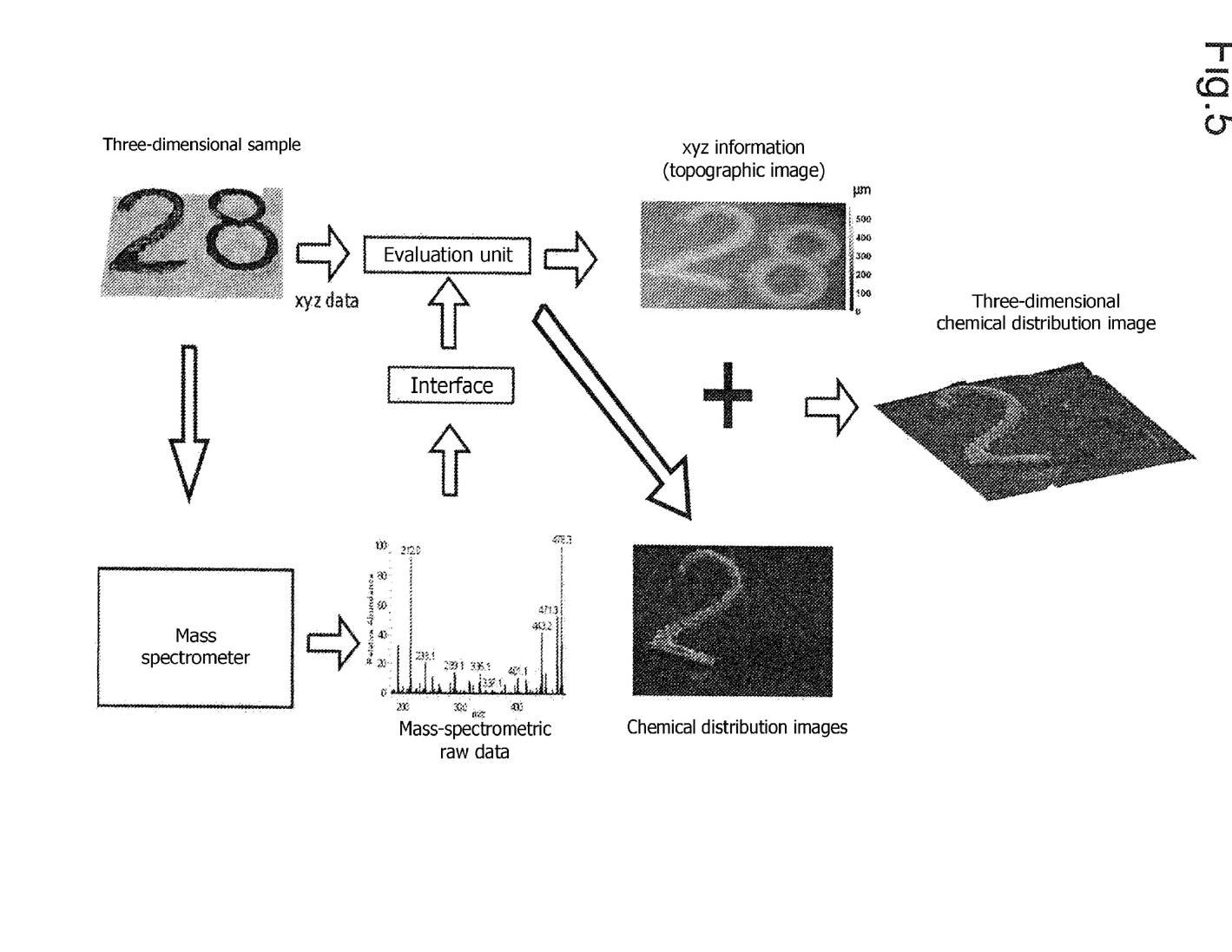

The obtained multi-dimensional information (topography, spatially dependent chemical distribution and chemical composition) is evaluated using the developed software and imaged in multi-dimensional representations (FIG. 5).

In a further embodiment, provision is made for the apparatus and the method to be used in time-of-flight mass spectrometry.

Alternatively, provision is made for the apparatus to be used in quadrupole, ion trap, ion cyclotron resonance or orbital trap mass spectrometry.

KEY TO THE FIGURES AND LIST OF REFERENCE SIGNS

FIG. 5 represents the progress of the data evaluation. The spatial information (x, y and z coordinate) produced by the apparatus 100, 200 is read in the evaluation unit. The mass-spectrometric raw data generated by the mass spectrometer 7 are likewise read in the evaluation unit via the interface. The evaluation unit generates a topographic image and a chemical distribution image of the sample. In a further step, the topographic image and the chemical distribution image are converted into three-dimensional chemical distribution image and the latter is displayed.

LIST OF REFERENCE SIGNS

1 Displacement stage
2 Desorption/ionization beam of the energy source
3 Optical system
4 Light detector
5 Lens element with a central bore
6 Ion guidance channel
7 Mass spectrometer
8, 10 Light source
11, 12 Focusing system
100, 200 Apparatus
20, 10 Energy source
30 Control unit
40 Evaluation unit
50 Interface
60 Measurement point

The invention claimed is:

1. An apparatus for mass-spectrometric analysis and imaging of the surface of a sample, comprising
at least one energy source for desorbing or desorbing and ionizing atoms from the surface of a sample for a transmission into a mass spectrometer,
a displacement stage that is embodied such that a sample to be examined can be fastened thereon, the beam path of the energy source and the displacement stage being embodied to be movable in relation to one another,
a light source,
a control unit for controlling the displacement stage, the energy source, and the light source, the latter being embodied such that the surface of a sample can be irradiated in punctiform fashion by the energy source and the light source at a measurement point,
an interface for being able to interchange data with a mass spectrometer, the interface being embodied in such a way that measurement data about the chemical composition of the surface of the sample at a measurement point can be transmitted from the mass spectrometer to an evaluation unit via the interface such that the chemical composition of the measurement point can be determined by the evaluation unit,
characterized in that the apparatus furthermore comprises an optical system and, a light detector, wherein the light source, the optical system and the light detector are embodied such that a measurement point on a sample is illuminated by the light source via an optical system and light reflected or scattered by the measurement point can be captured by the light detector with the upstream optical system such that the surface of a sample can be captured in three dimensions and the topography of this surface can be determined by the evaluation unit.

2. The apparatus as claimed in claim 1, characterized in that the energy source is embodied as a desorption laser or an ionization laser.

3. The apparatus as claimed in claim 1, characterized in that the light source is embodied as a laser.

4. The apparatus as claimed in claim 1, characterized in that the apparatus furthermore comprises an ion guidance channel for guiding ions that were released from the surface of a sample by the energy source.

5. The apparatus as claimed in claim 1, characterized in that the apparatus furthermore comprises a focusing system for focusing the radiation from the energy source of the on the surface of a sample.

6. The apparatus as claimed in claim 1, characterized in that said apparatus furthermore comprises a focusing system for focusing the radiation from the light source on the surface of a sample.

7. The apparatus as claimed in claim 1, characterized in that the energy source for the desorption/ionization and the light source are formed by the same laser.

8. A method for mass-spectrometric analysis and imaging of the surface of a sample using an apparatus for mass-spectrometric analysis and chemical imaging of the surface of a sample, comprising at least one energy source for desorbing or desorbing and ionizing atoms or molecules from the surface of a sample for a transmission into a mass spectrometer, a displacement stage that is embodied such that a sample to be examined can be fastened thereon, the beam path of the energy source and the displacement stage being embodied to be movable in relation to one another, a light source, a control unit for controlling the displacement stage, the energy source, and the light source, the latter being embodied such that the surface of a sample can be irradiated in punctiform fashion by the energy source and the light source at a measurement point, an interface for being able to interchange data with a mass spectrometer, the interface being embodied in such a way that measurement data about the chemical composition of the surface of the sample at a measurement point can be transmitted from the mass spectrometer to an evaluation unit via the interface such that the chemical composition of the measurement point can be determined by the evaluation unit, wherein the apparatus furthermore comprises an optical system and a light detector, wherein the light source, the optical system and the light detector are embodied such that a measurement point on a sample is illuminated by the light source via an optical system and light reflected or scattered by the measurement point can be captured by the light detector with the upstream optical system such that the surface of a sample can be captured in three dimensions and the topography of this surface can be determined by the evaluation unit, characterized in that the sample to be examined is examined in punctiform fashion in scanning operation in step-by-step fashion or under continuous movement by moving the displacement stage or the energy source.

9. The method as claimed in claim 8, characterized in that the z-position of individual points of the sample surface is additionally determined.

10. The method for analysis as claimed in claim 8, characterized in that output signals of the light detector or sensor control the apparatus during scanning operation, with scanning and a determination of the topography by way of evaluating the z-coordinate being undertaken.

11. The method for analysis as claimed in claim 8, characterized in that the position of the displacement stage is modified in targeted fashion by the control unit for the purposes of realizing the scanning operation.

12. The method for analysis as claimed in claim 8, characterized in that the position of the focusing system for focusing the radiation from the energy source is modified in targeted fashion by the control unit for the purposes of realizing the scanning operation.

13. The method for analysis as claimed in claim 8, characterized in that mass-spectrometric raw data are obtained from the substances to be examined.

14. The method as claimed in claim 8, characterized in that a multi-dimensional data matrix is produced by virtue of the calculated mass-to-charge number ratios, intensities and Cartesian coordinates being assigned to each detected mass-spectrometric signal.

15. The method for analysis as claimed in claim 8, characterized in that the height and distribution information is converted into grayscale or color coding and pictorial representations are produced.

* * * * *

UNITED STATES PATENT AND TRADEMARK OFFICE
CERTIFICATE OF CORRECTION

PATENT NO. : 10,964,519 B2
APPLICATION NO. : 16/339993
DATED : March 30, 2021
INVENTOR(S) : Bernhard Spengler et al.

It is certified that error appears in the above-identified patent and that said Letters Patent is hereby corrected as shown below:

In the Claims

Column 8, Lines 3-4, "of the on the" should read -- on the --.

Column 8, Line 43, "unit," should read -- unit --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*